United States Patent [19]

Harney et al.

[11] Patent Number: 4,517,069

[45] Date of Patent: May 14, 1985

[54] TITANIUM AND TITANIUM HYDRIDE RETICULATES AND METHOD FOR MAKING

[75] Inventors: Marilyn J. Harney, Painesville; Elvin M. Vauss, Jr., Cleveland; Ajit Y. Sane, Willoughby, all of Ohio

[73] Assignee: Eltech Systems Corporation, Boca Raton, Fla.

[21] Appl. No.: 509,731

[22] Filed: Jul. 1, 1983

Related U.S. Application Data

[63] Continuation-in-part of Ser. No. 396,747, Jul. 9, 1982, abandoned.

[51] Int. Cl.$^3$ .................. C25B 11/00; C25C 7/02
[52] U.S. Cl. .................... 204/290 F; 75/20 F; 428/613; 423/608; 502/301; 502/350
[58] Field of Search .............. 75/20 F; 428/613; 423/608; 502/301, 350; 204/290 F

[56] References Cited

U.S. PATENT DOCUMENTS

| | | | |
|---|---|---|---|
| 2,917,384 | 12/1959 | Grandey | 75/20 F |
| 3,214,265 | 10/1965 | Fiedler | 75/20 |
| 3,214,270 | 10/1965 | Valyl | 419/2 |
| 3,214,287 | 10/1965 | Mosna | 427/318 |
| 3,218,684 | 11/1965 | Spink | 164/79 |
| 3,224,846 | 12/1965 | Fiedler et al. | 428/613 |
| 3,433,632 | 3/1969 | Elbert | 75/20 F |
| 3,647,721 | 3/1972 | Salyer et al. | 521/63 |
| 3,897,221 | 7/1975 | Salyer et al. | 428/566 |
| 4,133,691 | 1/1979 | Kindt | 106/75 |
| 4,299,682 | 4/1982 | Oda et al. | 204/265 |

Primary Examiner—John F. Niebling
Attorney, Agent, or Firm—John J. Freer

[57] ABSTRACT

A self-supporting reticulate of titanium hydride (TiH$_2$) is formed by slurry-coating an open cell organic synthetic resinous material, or other pore-former, and eliminating the carbon-containing components of binder and/or solvent, viscosity modifiers, thickening agents, and the like at a temperature below about 400° C. In an analogous manner, an inorganic refractory material open cell substrate or other pore-former substrate may be slurry-coated and converted to a TiH$_2$ reticulate in which the substrate is coated with TiH$_2$ to yield a supported TiH$_2$ reticulate. Either the self-supporting TiH$_2$ reticulate, or the supported one, free of carbonaceous material, may be sintered to yield an essentially pure Ti (metal) reticulate which is essentially free of titanium carbide. Ti reticulates so formed are coated with Pt group metal oxides and used as anodes in chloroalkali cells.

20 Claims, 2 Drawing Figures

TITANIUM AND TITANIUM HYDRIDE RETICULATES AND METHOD FOR MAKING

CROSS-REFERENCE TO RELATED APPLICATIONS

This application is a continuation-in-part application of Ser. No. 396,747 filed July 9, 1982.

BACKGROUND OF THE INVENTION

This invention relates to porous metal bodies, termed "reticulates", of titanium (Ti) and titanium hydride. By a "reticulate" we refer specifically to an open cell, or open pore (openly porous) metal or metal-like structure of arbitrary size in which a multiplicity of voids, whether cells, pores and/or passages are in open fluid communication with each other.

A recticulate of this invention may be formed with a predetermined relatively uniform pore size and porosity in each unit volume of its structure. A reticulate may also be formed, if so desired, with a wide range of pore sizes in each unit volume. Preferred reticulates of this invention have an "open cell foam morphology" characterized by large pores (or "cells") bounded by strands (also referred to as filaments or ribbons), the pores being interconnected. The strands are generally not circular but irregular in cross-section having an average thickness (measured in a direction at right angle to the direction in which width of a strand is measured) or an average equivalent diameter (assuming a circular cross-section) of less than 10 mils, and preferably in the range from about 0.2 mil to about 5 mils (0.005 inch), hence the term "thin-strand reticulate".

There is very little reference in the prior art to the formation of thin coatings of Ti metal, mostly because from a practical point of view, it can be neither electroplated nor deposited by conventional electroless deposition techniques. We know of no reference to the formation of an open cell foam of Ti metal, or an open cell foam of titanium hydride.

Reticulates of this invention are formed from titanium hydride ("TiH$_2$ recticulate"), and, from Ti metal derived by sintering the TiH$_2$ reticulate to obtain the Ti metal reticulate ("Ti reticulate"). A TiH$_2$ reticulate supported on a refractory material such as a ceramic foam is referred to as "metal-like" because of its physical strength. Each reticulate has a porosity in excess of 30%, preferably in excess of 50%, and most preferably in the range from about 75–98%. Reticulates having a porosity in the range from about 50–80% are sometimes referred to as "felt-like porous bodies"; and, those having a porosity in the upper range are referred to as "sponge metals". See Characteristics and Applications of Sponge Metal" by Eiji Kamijo and Masaaki Honda, in *Chemical Economy & Engineering Review*, published by Chemical Economy Research Institute (Japan), Dec. 1975, the disclosure of which is incorporated by reference thereto as if fully incorporated herein. It is essential that the reticulates of this invention be essentially free of titanium carbide (TiC), that is, there should be less than 0.5 percent by weight (% by wt) of TiC, and preferably no more than 0.1% by wt more TiC than contained in the starting (original) TiH$_2$ powder.

Our reticulates, like the Kamijo et al sponge metals have a framework extending in all directions in a continuous reticulated structure, all the pores being connected, though their pores are said to have a spherical shape. Such sponge metals cannot be produced by conventional 'loose sintering' or 'press sintering' of powder metals. These Kamijo et al sponge metals include those of pure metals such as nickel, copper and iron, as well as alloys such as Nichrome, though there is no enabling disclosure as to how such sponge metals may be prepared. Neither is there any suggestion that metal hydrides of any kind may be used to produce the sponge metals.

Hydrides of titanium are unique in that they are non-stoichiometric compounds thought to comprise interstitially held hydrogen in varying amounts. Titanium hydride is generally represented as TiH$_2$ and will be so represented hereinafter.

The Ti (metal) reticulate of this invention is in its most preferred embodiment, a "metal sponge" or "sponge metal" which should not be confused with "metal foam". Metal foam consists of gas-containing discrete cells distributed in a metal matrix in a generally uniform manner, each cell being entirely enclosed and generally being not connected to any neighboring cell. Similarly, the TiH$_2$ reticulate is an open cell structure.

Numerous methods have been employed in the production of porous metal bodies, particularly sponge metals, in the past decade or so, because of the enhanced interest in utilizing such bodies in specialized applications identified in Kamijo et al, supra. One of such applications is the production of sponge metal sheets used for sound absorption, insulation against heat and cold, and as demisters, inter alia. These methods include (a) sintering of metal particles, (b) the use of materials which liberate gas at elevated temperatures to cause voids in molten metal, (c) the use of slip casting techniques in which metal particles are suspended in a variety of liquid or solid binders and then heated to eliminate the solvent or binder, and (d) electroless coating or electroplating of porous materials.

How porous metal bodies are derived from powder metals is extensively discussed in texts and articles on powder metallurgy, and it is well known that such powder metal-derived porous bodies have relatively low porosity, less than about 30%, and that their pore size is determined by the size of the powder metal particles. What is not so well known is that porous bodies derived from powder metals have characteristics which are quite different from those of sponge metals.

Further, a powder of Ti metal is generally regarded as being difficultly sinterable and we know of no teaching in the prior art that TiH$_2$ powder may be substituted for Ti powder; or, that there was any compelling reason for forming a TiH$_2$ reticulate; or, that such a TiH$_2$ reticulate may, if desired, be converted by sintering, to a Ti reticulate.

With respect to forming a sponge metal by the evolution of gas in a molten metal, it is acknowledged to be an unsatisfactory way of producing a reticulate because neither the porosity nor the pore size can be controlled within a preselected range; not only from one batch to another, but within the same batch.

Reducing to practice the concept of leaching solids to form a porous metal structure is arduous yet simple, but the effectiveness of such a procedure is very much related to the properties of the metal, and also, the solid which is to be leached from the metal, with the result that this method is now consistently disfavored. For example, U.S. Pat. No. 3,218,684 teaches that a cast tubular magnesium reticulate is formed by pouring molten magnesium over prilled NaCl pellets in a mold.

Moreover, this leaching process does not produce "thin-strand" reticulates.

We do not know of any method for the electroless coating of synthetic resins, such as polyurethane foam, with metals such as nickel, copper, etc. which method is also applicable to titanium; and we know that titanium can be electroplated in molten salt but this method would be inapplicable to coating synthetic resinous foams. Producing porous Ti reticulates by sintering $TiH_2$ initially appeared unpromising because of the well-known difficulty of removing the internal hydrogen sufficiently completely so as not to leave an embrittled Ti structure. See "Effect of Hydrogen on Titanium and its Alloys" by Paton, N. E. and Williams, J. C., *Hydrogen in Metals* edited by Bernstein, I. M. et al., American Society for Metals, (1974).

All the prior art methods are subject to numerous drawbacks among which are (i) the reticulate's porosity is non-uniform and generally less than 50%, (ii) its pore size is not controllable within a desirably narrow range, and (iii) the methods do not lend themselves to the manufacture of relatively large shaped reticulates, for example, parallelepipeds up to 5 ft×5 ft×6 in.

The aforesaid drawbacks are said to be overcome in a method disclosed in U.S. Pat. No. 3,111,396 comprising coating an open cell polymethane foam with a suspension of a powdered metal or metal oxide in a fluid, slowly drying the impregnated organic structure, heating the impregnated organic structure to decompose the organic structure and the fluid while closely retaining the shape and size of the original organic structure, and then heating the impregnated carbon-powdered material structure to further join the powder into a continuous form. A slurry was formed with finely divided metal, or metal oxide, or other metal compound in a fluid, optionally with a decomposable thickening agent, a metal hydride or a salt which will perform or provide for some binding action. An organic cellular or porous structure was coated with the slurry, and after drying, heated to a (first) temperature sufficient to reduce the organic structure to carbon, though there is no teaching as to what critical atmospheric control accomplishes this. This carbon structure, coated with powder of the original slurry is then heated to a (second) higher temperature than before to assure full carbonization of the organic structure. The fully carbonized structure which is essential to maintain the coherency of the particles to be sintered, is then heated to a (third) still higher temperature to sinter the powder into a foam product.

The drawback of the aforesaid process is that sintering the fully carbonized structure results in the formation of a substantial quantity of carbides of those metals which are reactive with carbon at sintering temperatures even in an atmosphere which is inert with respect to Ti. Ti is such a reactive metal.

To produce the desired Ti metal reticulate which is essentially free of metal carbide, it is critical that essentially all carbon and carbon-containing compounds ("carbonaceous material") be removed prior to commencing sintering of a sinterable powder. As far as we have determined, only the hydrides of Ti lend themselves to this application because it is a first peculiarity of $TiH_2$ that it decomposes at a temperature much lower than the decomposition temperature of the oxides.

A second peculiarity of $TiH_2$ is critical to the formation of the sintered metal reticulates of this invention, namely, that upon sintering, the hydride undergoes a shrinkage in volume. For example, $TiH_2$ undergoes at least 10%, and generally about a 15% reduction in volume, so that there is a substantial contraction in volume from the original volume of the organic porous material impregnated with slurry. This shrinkage of volume of metal hydride particles exerts a particle-to-particle pressure sufficient to form a diffusion bond and sinter the particles. Such a diffusion bond was known to be formed only under relatively high pressure, as for example taught in "Titanium Powder Metallurgy by Decomposition Sintering of the Hydride" by Greenspan, J. et al. *Titanium Science and Technology* edited by Jaffee, R. I. et al., Vol. 1, Plenum Press (1973).

A third peculiarity, critical to our invention, is that a slurry of $TiH_2$ powder and a fugitive binder on a fugitive pore-former produces a self-supporting binderless $TiH_2$ reticulate when the binder and pore-former are driven off by heating in an inert oxygen-free atmosphere; or, if the slurry is coated on an inorganic reticulate pore-former, it produces a pore-former-supported binderless $TiH_2$ reticulate. The latter is independently useful as a hydrogenation catalyst for the hydrogenation of vegetable oils and the like. $TiH_2$ is a known hydrogenation catalyst (see "Supported Titanium Hydride as a Hydrogenation Catalyst" by Lisichkin, G. V., et al, *Vses Khim. Oeva* 1978, 23(23) 356-7, Russia). Because this binderless structure can be freed of carbonaceous material at a temperature below about 400° C. at which $TiH_2$ starts to decompose, it becomes possible to sinter the $TiH_2$ reticulates under helium or argon at essentially atmospheric pressure, to produce the thin-strand Ti reticulates of this invention.

Metal hydrides and salts of metals have been used in the prior art as binders, particularly the metal hydrides, to produce metal foam as a result of their decomposition (see U.S. Pat. No. 3,794,481). As will be evident, the $TiH_2$ used in the process of our invention is not a binder, and its decomposition upon sintering produces no foaming. Further, there was no reason to expect that a slurry of decomposable $TiH_2$ might be sintered without reaction with the components of the slurry at the elevated temperatures at which decomposition of $TiH_2$ occurs.

The desirability of fabricating a Ti reticulate for service as an anode presented itself because of unremitting efforts to solve a problem endemic to conventional chloralkali electrolytic cells. In such cells, any restricted circulation of electrolyte through an expanded metal ("mesh") or porous metal anode contributes to a deleterious bubble overpotential so termed because of $Cl_2$ bubbles clinging to the anode, thereby reducing the active surface area and increasing the electrical resistance. Anodes of Ti mesh coated with a Pt group metal oxide are favored in industrial chloralkali electrolytic cells because it has been found that the less restricted the circulation of electrolyte, the lower the electrode overpotential.

Recognizing however, that a practical reticulate anode is preferably a relatively thick parallelepiped—industrial anodes range from about 5 cm to about 20 cm thick, and may be from 1 ft wide × 1 ft long, to as much as 5 ft wide × 6 ft long,—it was far from evident how effectively the proclivity for bubble formation could be countered by improved circulation attributable to large pores and high porosity of the anode.

SUMMARY OF THE INVENTION

It has been discovered that the dissimilar physical and chemical properties of a powder of Ti metal, oxide, nitride, and other Ti compounds, compared with those of a finely divided TiH₂ allows it (TiH₂) to be used in a slurry with a fugitive binder, and a fugitive pore-forming means or pore-precursor (hereafter "pore-former"), which are eliminated to form a TiH₂ reticulate ("green reticulate"). The porosity of the TiH₂ reticulate is determined by the pore-former, and is independent of the size of the TiH₂ particles.

It is therefore a general object of this invention to provide a self-supporting thin-strand TiH₂ reticulate which is essentially free of carbonaceous material. Such a self-supporting thin-strand TiH₂ reticulate is formed by coating an organic open cell pore-former, or discrete pore-former beads, pellets and the like, with a slurry of TiH₂ particles, binder and optionally solvent and/or viscosity modifiers, then eliminating the pore-former and all carbonaceous material at below about 400° C. in an oxygen-free inert gas atmosphere without forming a carbonized structure.

It is also a general object of this invention to provide a TiH₂ reticulate consisting essentially of TiH₂ powder in particle-to-particle contact forming a substantially uniform coating coherently supported on an inorganic carbon-free substrate having an open cell foam morphology, and pores characterized as hereinbefore, which reticulate is essentially free of titanium carbide (TiC).

A process has been discovered for "decomposition sintering" a TiH₂ reticulate by exerting only about atmospheric pressure with helium or argon on the hydride (hence also referred to as "pressureless decomposition sintering"). No other compound of titanium that we know of, lends itself to our process.

It is therefore a general object of this invention to provide a process for making a thin-strand reticulate of essentially pure Ti comprising, coating a pore-former substantially uniformly with a viscous (more than 100,000 cp) slurry of TiH₂ particles and binder present in a weight ratio of at least 2:1, and preferably from about 20:1 to about 50:1; eliminating the binder and pore-former at a temperature below about 400° C. so as to form a green reticulate essentially free of carbonaceous material; and, heating the green reticulate in a helium or argon atmosphere at about 70 cm to about 80 cm Hg pressure, at a temperature sufficient to shrink the volume of a green self-supporting reticulate by at least about 10%, for long enough to sinter it without forming more than 0.1% by wt more TiC than was present in the TiH₂ powder used to form the slurry.

It is also a general object of this invention to provide a process for bonding a coating of Ti metal less than 10 mils thick, and preferably from abou 0.2 mil to about 5 mils thick, substantially uniformly to a refractory material selected from the group consisting of alumina, zirconia and siliceous compounds. The process comprises coating an available ceramic foam with at least one, and on occasion several, coats of a more fluid slurry (less than 100,000 cp) than that used in the immediately prior embodiment hereinabove, eliminating the binder at below about 400° C. in an inert gas atmosphere so as to leave essentially no carbonaceous material in the reticulate, then sintering as specified hereinabove.

It has also been discovered that a "Beer-coated" sintered Ti reticulate is surprisingly effective as an electrode in an electrolytic chlor-alkali cell. By "Beer-coated" we refer to a catalytic coating comprising at least one platinum (Pt) group metal which is applied to the electrode, and which Pt group metal is then converted to its oxide.

It is therefore an additional object of this invention to provide a Beer-coated Ti reticulate for use as an electrode, specifically as an anode in a chlor-alkali cell.

DETAILED DESCRIPTION OF PREFERRED EMBODIMENTS

Figure 1:
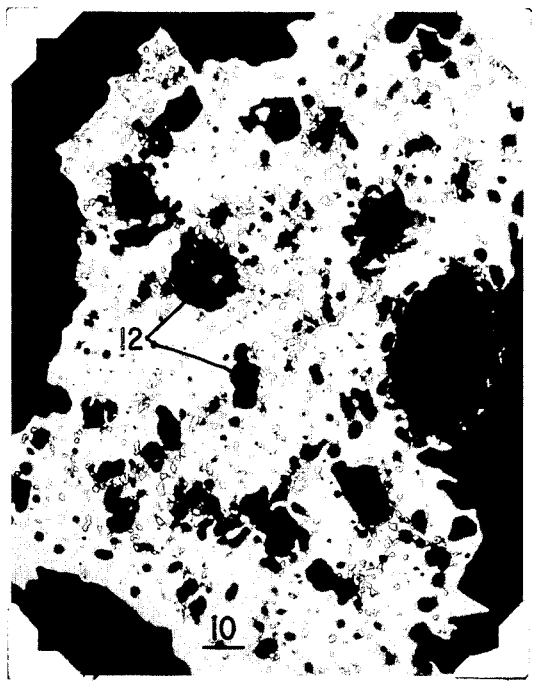
FIG. 1 is an electron photomicrograph at 60X magnification, of a typical Ti reticulate of this invention.

This invention is directed, in the first instance, to a reticulate of TiH₂ having (i) a porosity greater than 30%, more preferably greater than 50%, and most preferably in the range from about 75–98%; (ii) a pore size in the range from about 0.05 cm to about 1 cm, and preferably from about 0.1 to about 0.5 cm; and (iii) an average strand thickness, or equivalent diameter of less than 10 mils. Such a TiH₂ reticulate is referred to as a "green reticulate" or "greenware" because it is not sintered.

This invention is most specifically directed, in its best mode, to a "large pore" reticulate having a porosity in the range from about 75–98%, easily visible pores being in the size range from about 0.05 cm to about 0.5 cm or larger; and, which reticulate, on the whole, visually resembles the morphology of the pore-former form which it (the reticulate) is derived so closely as to meet quite well the criterion of being visually substantially identical.

In one embodiment, such a TiH₂ reticulate is formed by coating an open cell organic or inorganic foam or sponge ("pore-former") having a porosity in the range from about 50–98% with a slurry of TiH₂ particles and binder. By "slurry" we refer to a flowable liquid or fluid mixture the viscosity of which is sufficient to adherently coat the pore-former so as to provide a shaped mass of desirable, though arbitrary, dimensions suitable for a predetermined end use.

In a second embodiment, such a TiH₂ reticulate is formed by dispersing, preferably substantially uniformly by blending with the slurry, a mass of discrete pore-former particles, pellets or the like, and forming the slurry into a shaped mass. The size and shape of the pore-former particles determine, approximately, the pore size and porosity of the hydride reticulate when the particles are eliminated. This reticulate with uniformly relatively large pores is also characterized herein as having an open cell foam morphology.

This invention is directed, in the second instance, to a sintered Ti metal reticulate derived from a slurry-coated pore-former by eliminating the binder, including, optionally, a solvent, dispersing and wetting agents, and/or thickening aids and emulsifiers and the like, if such are used, and also removing the pore-former at below about 400° C. in an inert atmosphere of nitrogen, helium, argon or the like so as not to leave any carbonaceous material, or react with the Ti. Any carbonaceous material reacts with Ti to form TiC when the green reticulate is sintered. Essentially pure Ti is formed without being subjected to any other pressure than substantially atmospheric pressure of helium or argon. The Ti is at least 99.5% pure and contains no more than 0.5% by wt TiC, or, no more than 0.1% by wt more TiC than contained in the starting (original) TiH₂ powder, whichever is less.

Though the commercial attractiveness of this process is in large measure attributable to "pressureless" processing, it will be realized that higher pressure than atmospheric will also result in properly sintered Ti but pressurized processing serves no economic purpose. If a refractory pore-former is used which is not degraded at sintering temperature, the reticulate formed has Ti bonded to the pore-former.

The size range of the $TiH_2$ particles is not critical provided that they are small enough to form a stable quiescent dispersion in the slurry, so that the particles do not settle substantially. $TiH_2$ particles desirably have a primary particle size range from about 400 mesh (38 micrometers) to about 100 mesh (150 micrometers), U.S. Standard Test Sieves (wire cloth) it being preferred that they be smaller than 45 micrometers, that is, they pass through a 325 mesh sieve (−325 mesh).

The binder must (i) result in the formation of a slurry having a viscosity in the range from about 20,000 cp to about 500,00 cp (centipoise) as determined by a Brooks® meter using a RVT#6 spindle; (ii) serve to adhere the metal hydride particles when the green reticulate is formed and (iii) be essentially unreactive with the metal hydride at a temperature sufficiently high to eliminate the binder prior to sintering the green reticulate. As little binder as possible is used, consistent with obtaining the desired adhesion, to facilitate complete elimination of the binder at a later time. A ratio of about 150 parts by wt of $TiH_2$ particles for each part by wt of binder (150:1) appears to be the upper limit of the ratio; the lower limit is preferably about 20:1, it being recognized that the morphology of the $TiH_2$ particles, inter alia, will influence these ratios, and that at the lower ratios, it becomes increasingly difficult to eliminate the carbonaceous material.

Conveniently obtainable binders are starches, sugars, gums and the like, and thermosettable synthetic resinous materials capable of forming, upon cross linking, a machinable shaped mass. Such cross-linkable resins include the epoxy, polycarbonate and (meth)acrylate resins with molecular weights (mol wts) consistent with providing a slurry preferably having a viscosity near the top of the aforespecified range, it being preferred to use a slurry which is barely fluid at room temperature. Other commercially obtainable binders include thermoformable resins particularly poly(vinyl chloride), which is suitably plasticized, for example, with dioctylphtalate.

The binder may include a solvent to adjust the viscosity of the slurry in the aforespecified range, provided the solvent may be volatilized without reacting with the hydride. Most preferred volatile solvents include water, aliphatic primary and secondary lower alcohols having from about 1 to 6 carbon atoms, particularly isopropanol, aromatic hydrocarbons particularly xylene, toluene and benzene, acyclic and cyclic ketones, particularly acetone and cyclohexanone, tetrahydrofuran, dimethylformamide, mineral spirits and the like, which are driven off by drying and baking at about 200° C. or lower.

The preferred binder is a water soluble resin selected from the group consisting of the alkyl- and hydroxyalkyl ethers of cellulose and starch generally referred to as modified starches, methyl- and hydroxypropyl methyl-cellulose derivatives, hydroxyethylcellulose, carboxymethylcellulose, polyvinyl alcohol, polyvinylpyrrolidone, poly(acrylic acid) and its homologs, polyacrylamide, ethylene oxide polymers, and polyethylenimine.

Most preferred binder is polyvinyl alcohol (PVA) or polyacrylamide (PAAm) present in aqueous solution. A preferred viscous slurry includes from about 20 to about 50 parts by wt of $TiH_2$ particles per part of binder, depending on the mol wt (viscosity) of the PVA or PAAm, and the morphology of the $TiH_2$ particles.

It may be desirable, in a binder including a solvent, to include a viscosity modifier, thickening agent or gel-former which individually or collectively function to enhance the strength and durability of the slurry-pore-former. Particularly when the binder includes water and a water-soluble resin, it may also be desirable to include a wetting or dispersing agent to improve the stability of the dispersion of particles in the slurry, and its homogeneity.

The slurry containing the $TiH_2$ powder, binder, solvent and other ingredients may be prepared in any convenient manner. One such method is to prepare a solution of the binder, etc. and gradually add the $TiH_2$ particles, while stirring, until the desired consistency of slurry is obtained. When PVA is the binder, it is simply dissolved in hot water and the particles added to the solution, while stirring, until the desired consistency for adhesion of slurry to the pore-former is obtained.

Where the pore-former is a polyurethane foam, it is simply dipped into, or otherwise coated with the slurry, excess slurry removed by blowing through the foam with a gas, preferably air, to make sure the pore-former is evenly coated and that all the voids are interconnected, and the slurry-coated foam is dried and baked to remove the water, resulting in a solvent-free reticulate which still is supported by the pore-former.

Whether the pore-former is a mass of open cell organic foam, or a mass of discrete beads, it will be realized that the average pore size of the sintered structure will be slightly less than the average diameter of the voids in the green reticulate because of shrinkage which occurs upon sintering. With respect to the beads, they may range in size from about 0.05 cm to about 1 cm, but it is most preferred that they be relatively large in the range from about 0.1 to about 0.5 cm in diameter. The amount of beads used in relation to the slurry will depend upon the volume of individual beads and the size and shape of the shaped mass of slurry-coated beads to be formed. Clearly, there must be enough beads to provide essentially complete bead-to-bead contact between enough beads to provide a substantially fully interconnected pore structure when the beads are removed.

The slurry-coated pore-former beads may be formed into a shaped mass by any suitable method, such as by slip casting, molding, manual forming and the like.

After forming the shaped mass the solvent is removed to accelerate the set of the binder, and this may be effected by drying and baking under subatmospheric (vacuum), atmospheric or superatmospheric pressure, preferably in an air convection oven.

The beads may be removed by dissolving with a suitable solvent, polystyrene beads dissolving quite easily in acetone without dissolving the binder. More conveniently, the beads may be volatilized by heating in the range from about 200° C. to about 400° C. in argon.

Since the binder is critical to maintaining the self-supporting form of the shaped mass of hydride particles prior to elimination of the pore-former, it is essential that the binder not be removed except after, or essentially simultaneously with, removal of the pore-former. Where the pore-former is an inorganic material to be eliminated, it may be dissolved with an acid and/or alkali which does not react with TiH$_2$ or the binder. For example, a mass of generally spherular pellets of calcium carbonate may be used as the pore-former which dissolves in dilute HCl acid. As explained hereinbefore, a ceramic foam substrate may be retained.

Removal of an organic binder is most preferably effected by simply heating the baked slurry-coated reticulate to below about 400° C. under an inert atmosphere and for a time sufficient to eliminate the binder. The completeness of elimination of the carbonaceous material may be monitored by analysis of a purge stream which desirably should contain about 100 ppm carbon oxides, or less to avoid formation of TiC during sintering.

It will now be apparent that where the TiH$_2$ reticulate is to be sintered, it is critical that the binder, including solvent and additives (if used), and organic pore-former be fugitive, so they may be eliminated before sintering to leave a green reticulate which is essentially free of carbonaceous material. Therefore all such ingredients, namely the solvent, plasticizer, organic thickening agent, wetting and dispersing agents, and the like are materials which will either volatilize, decompose completely, or oxidize below 400° C. without leaving a carbonized skeleton or a harmful carbonaceous residue.

However, where the TiH$_2$ reticulate is to be used under conditions when the pore-former is not deleteriously affected under conditions of use, the pore-former need not be fugitive. Such is the case where, for example, the pore-former is an open cell refractory material, ceramic or glass foam, or an open cell foam of an alkali metal silicate or an alkaline earth metal silicate. It will be also be apparent that where a mass of polystyrene beads (say) is used as the pore-former, the beads must necessarily be eliminated to provide the pores.

The resulting green TiH$_2$ reticulate consisting essentially of a self-supporting mass of adherent TiH$_2$ particles is fragile. A green reticulate supported on a refractory substrate is much less so. The self-supporting green TiH$_2$ reticulate is sintered in an aforespecified atmosphere of helium or argon, to obtain a shrinkage of at least 10% by volume, by heating at a temperature in the range from above about 600° C. but below 1800° C., more preferably in the range from about 1100° to about 1500° 1 C. TiH$_2$ is most effectively sintered at 1100°±100° C. Sintering decomposes the TiH$_2$ particles to Ti, coadhering the particles firmly to form a strong, sintered reticulate.

A refractory material which is coated with a thin coating of TiH$_2$ will not shrink if there is no shrinkage of the refractory material, but the TiH$_2$ particles will shrink to form a skin of essentially pure Ti.

Because, quite unexpectedly, the sintered highly porous reticulates of this invention provide less electrode overpotential, and also less resistance to the flow of fluids, particularly liquids, therethrough than is provided by less porous prior art sintered structures, our reticulates are especially useful as cell anodes in chloralkali cells. In the most preferred embodiment, the titanium anode is coated with a catalyst, so that the reticulate functions as a catalyst support. Fabrication of anodes coated with catalysts ("Beer-catalysts") which improve the efficiency of the electrolysis, are taught in U.S. Pat. Nos. 3,632,498; 3,711,385; and 3,751,296, the disclosures of which are incorporated by reference thereto as if fully set forth herein. The anodes are in physical contact with a membrane divider separating the cells into cathode and anode compartments.

Referring to the drawings, FIG. 1 is an enlarged view, magnified 60X, as seen in an electron photomicrograph of a Ti reticulate, identified geenrally by reference numeral 10. The reticulate was made by impregnating an open cell polyurethane foam as described in detail in Example I hereinbelow. The typical large pores 12 are in the size range from about 0.05 cm to about 0.5 cm. In addition to these large pores there is a multiplicity of much smaller pores in the range from about 10–125 micrometers which smaller pores are formed as a result of sintering effects on the green reticulate.

The following examples are illustrative of specific embodiments of the invention, and reference to 'parts' herein refers to parts by weight unless otherwise specified.

EXAMPLE I

A slurry was produced by mixing approximately 25 ml of boiling water, 500 g of −325 TiH$_2$ powder, and 2.5 g PVA. The very viscous paste-like slurry was heated while stirring to disperse the TiH$_2$ particles thoroughly. The mixture was then blended with an equal volume of polystyrene beads from about 1 mm to about 3 mm diameter. This slurry-coated mass of beads is placed in a porous cylinder provided with a snugly fitting porous piston which is used to maintain sufficient pressure on the mass to assure bead-to-bead contact while the mass is dried in a vacuum oven maintained at about 100° C., overnight, so that substantially all the water is removed.

The polystyrene beads were then dissolved and washed out with acetone leaving a reticulate having interconnected voids closely visually approximating the shape of the fugitive beads, and held together with dried binder. This reticulate was placed in a furnace and baked in an argon atmosphere maintained at very slightly above room pressure (to ensure that air does not leak into the furnace), for from about 3 to 6 hr at just below 400° C. which eliminates the PVA, forming a self-supporting green TiH$_2$ reticulate. This green reticulate is then heated for about 1 to 4 hr at from 1000° C. to about 1300° C., again in an argon atmosphere at substantially ambient pressure, to produce a sintered Ti reticulate having pores in the size range about 10% smaller than the pores in the green reticulate, and a porosity of about 75%.

EXAMPLE II

In a manner analogous to that described in example I hereinabove, about 200 g of −325 mesh TiH$_2$ are blended with about 13 g of a commercially available (Devcon ®) epoxide mixed with about an equal volume of 'hardener' (provided with the epoxide). This blend of TiH$_2$ particles and resin is distributed over enough polystyrene beads so that each of the beads is coated with a thin coating of the paste-like slurry (volume of beads is more than twice the volume of the resin-particle blend). The resin is allowed to harden while the beads are maintained in bead-to-bead contact, and the beads are subsequently dissolved and washed out as before to leave a porous structure in which essentially all pores are in open fluid communication. This structure is heated to volatilize the resin to yield a green self-supporting reticulate, and subsequently sintered, as described in example I hereinabove.

The resulting Ti reticulate had a mean pore size of 2.2 mm and the large pores ranged from about 1.7 to about 2.6 mm. The porosity was about 80%.

EXAMPLE III

In a manner analogous to that described in example I hereinabove, about 100 g of the $TiH_2$ powder is blended with about 25 ml of water and 2.5 g of PAAm. The fluid slurry is distributed over a parallelepiped of an alumina reticulate about $6'' \times 6'' \times 1''$, procured from Astromet Associates, and an air hose is used to blow compressed air through the reticulate so as to coat the interior surfaces as evenly as can easily be done. The slurry-coated alumina is then dried at about 200° C. in a convection oven, thereafter heated to about 380° C., and then sintered as described in example I hereinabove.

The sintered reticulate appeared visually identical to the unsintered alumina, and the pressure drop of both air and water through each of the reticulates was substantially the same.

EXAMPLE IV

In a manner analogous to that described in example I hereinabove, a 5% by wt solution in water was prepared using a commercially available PVA having a viscosity in water at 20° C. of about 24–32 cp. Into the solution was stirred −325 mesh $TiH_2$ powder until a paste-like slurry is formed in which the weight ratio of $TiH_2$:slurry is about 50:1. This slurry is evenly distributed over one major surface of an open cell polyurethane foam (commercially designated as 10 pore per inch foam) so that the foam contains about 0.6 g $TiH_2$/cc of foam. This specification is based on the geometrical volume of the foam, indicating that a 1 cm×1 cm×1 cm portion of the foam was coated with 0.6 g of powder distributed on the available surface to which the slurry may adhere.

The coated foam is manipulated to coat all the unitary individual strands within the foam with slurry, and the foam is then 'blown out' with air under pressure to aid in distributing the slurry over all available surfaces. The slurry-coated foam is then dried in a convection oven to remove water, followed by heating at about 380° C., and sintering at about 1000° C., as before.

The Ti reticulate so obtained closely resembled the original polyurethane foam on which the slurry was coated, though the volume of reticulate is about 10% smaller. The porosity of the foam is more than 80% and there is no significantly greater pressure drop through the reticulate than there is through the original foam.

EXAMPLE V

A Ti reticulate made by the procedure described in example IV hereinabove serves as a catalyst support for the evolution of $ClO_2$ from $NaClO_4$. The reticulate was coated with a solution of 2 parts ruthenium chloride, 2 parts rhodium chloride and 1 part titanium chloride in aqueous acidic colution and baked at 530° C. for 7 mins. A portion weighing 0.9373 g immersed in a solution of 2N $Na_2ClO_4$ and 10N $H_2SO_4$ evolved $1.4 \times 10^{-6}$ moles/g/sec of $ClO_2$ above the background evolution. The apparent surface area was 16 $cm^2$.

Figure 2:
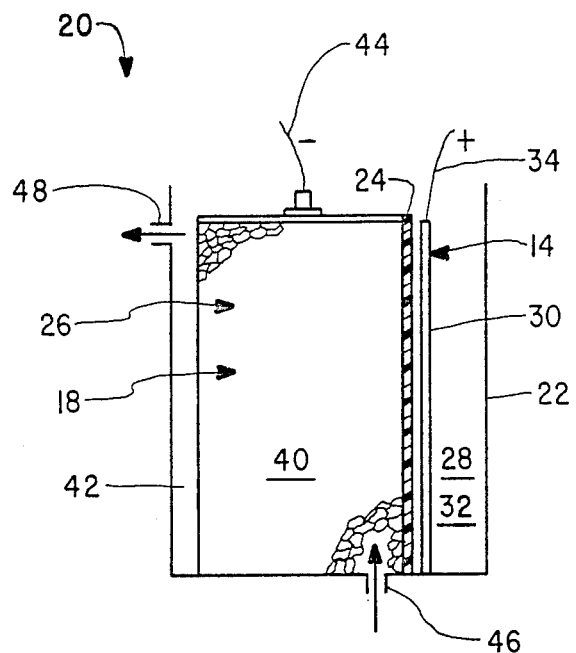
FIG. 2 is a cross-sectional view diagrammatically illustrating a chloralkali cell employing a Ti reticulate anode made in accordance with this invention.

Referring now to FIG. 2, there is shown a cell indicated generally by reference numeral 20, which employs an anode made in accordance withe the instant invention. The cell includes a housing 22 divided by a separator 24 into anode 26 and cathode 28 compartments.

The separator 24 may be a liquid (hydraulically) permeable diaphragm such as is conventionally used in industrial electrolytic cells; or, the separator may be a liquid impermeable cation exchange membrane preferably formed from a perfluorocarbon capable of providing, or being converted to provide, cation exchange functionality. In the best embodiment, the perfluorocarbon copolymer is a vinyl either copolymer having pendant functional groups, such as the polymer NAFION, marketed by E. I. duPont Company.

The perfluorocarbon having these pendant functional groups converted to provide active ion exchange sites, is available in sheet form. These sites on the sheeted polymer provide ion exchange utility of the perfluorocarbon polymer making it useful for cation exchange membranes and giving the polymer hydrophilic properties.

The polymer is prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonyl, carbonyl or, in some cases phosphonic acid based functional groups are typical examples. Esters, amides or salts based upon the same functional groups can also be utilized.

Among the preferred families of monomers in the second grouping are sulfonyl containing monomers containing the precursor functional group $SO_2X$ where X is a halide, usually fluorine or chlorine. Examples of members of such a family can be represented by the generic formula of $CF_2=CFSO_2F$ and $CF_2=CFR_1SO_2F$ where $R_1$ is a bifunctional perfluorinated radical comprising 2 to 25 carbon atoms and usually 2 to 8 carbon atoms.

The particular chemical content or structure of the perfluorinated radical linking the sulfonyl group to the copolymer chain is not critical and may have fluorine, chlorine or hydrogen atoms attached to the carbon atom to which the sulfonyl group is attached, although the carbon atom to which the sulfonyl group is attached must also have at least one fluorine atom attached. Preferably the monomers are perfluorinated. If the sulfonyl group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride containing comonomers be joined to the $R_1$ group through an ether linkage, i.e., that the comonomer be of the formula $CF_2=CFOR_1SO_2X$. Illustrative of such sulfonyl halide containing comonomers are:

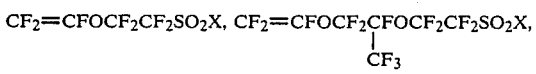

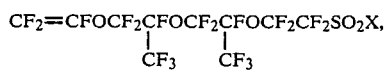

-continued

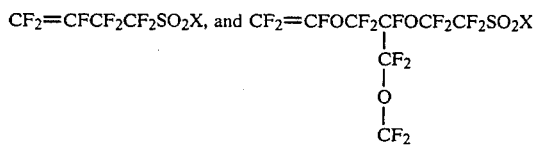

The corresponding esters, amides and sulfonates of the aforementioned sulfonyl halides can equally be used.

While the preferred intermediate copolymers are perflurocarbon, that is perfluorinated, others can be utilized where there is a fluorine atom attached to the carbon atom to which the sulfonyl group is attached. A highly preferred copolymer is one of tetrafluoroethylene and perfluoro(3,6-dioxa-4-methyl-7-octenesulfonyl fluoride) comprising between 10 and 60 weight percent, and preferably between 25 to 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

For its more traditional end uses such as for use as a membrane, the copolymer is readily transformed into a copolymer containing ion exchange sites by conversion of the sulfonyl halide groups ($-SO_2F$, $SO_2Cl$ or $-SO_3$ alkyl) to the form $-SO_3Z$ by saponification or the like wherein Z is hydrogen; an alkali metal such as lithium, sodium, potassium, rubidium and cesium; a quaternary amine; or an alkaline earth metal such as beryllium, magnesium, calcium, strontium and barium. The converted copolymer contains sulfonyl group based ion exchange sites contained in side chains of the copolymer and attached to carbon atoms having at least one attached fluorine atom. Not all sulfonyl groups within the intermediate copolymer need be converted. The conversion may be accomplished in any suitable or customary manner such as is shown in U.S. Pat. Nos. 3,770,547 and 3,784,399.

Copolymeric perfluorocarbon having pendant carbonyl based cationic exchange functional groups can be prepared in any suitable or conventional manner such as in accordance with U.S. Pat. No. 4,151,053 or Japanese Patent Application No. 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_2=CF-O-CF_2CF(CF_3)O(CF_2)_2COOCH_3$ and $CF_2=CF-O-CF_2CF(CF_3)O(CF_2)COOCH_3$. Perfluorocarbons polymerized from these monomers can be satisfactorily utilized as membrane materials in the instant invention.

The cell housing 22 is made from a material resistant to contents of the electrochemical cell in well known manner.

The cathode compartment 28 includes a cathode 30 of any suitable or conventional configuration immersed in catholyte 32 contained in the compartment 28. This cathode can be reticulate in nature and be positioned to be in physical contact with the separator. Such reticulates should be openly porous and electrically conductive. A current feeder 34 electrically connects the cathode 30 with a source of electrical potential (not shown).

The anode compartment 26 includes an openly porous reticulate anode 40 immersed in an anolyte 42. A current conductor 44 electrically connects the anode with the source of electrical potential. The current conductor 44 is preferably intermetallically connected to the anode 40 by welding, sintering or other suitable or conventional techniques.

The reticulate anode is formed in accordance with the method of the best embodiment of the instant invention. Forming can be accomplished by placement of the diluted dispersion in a cell housing 22 having a sheet metal separator in lieu of a diaphragm or membrane. Depending upon materials of construction of the cell housing, heating and/firing can also be accomplished within the cell confines, though it is generally preferable that the anode shape be removed for these functions.

The anode 40 generally fills the anode compartment while being in substantial physical contact with whatever separator is being used within the cell. Anolyte inlets 46 and outlets 48 are provided upon the housing 22 and anolyte 42 is circulated through the openly porous structure of the anode. Circulation reduces bubble and concentration voltage overpotentials within the openly porous reticulate anode.

For use as a chloralkali cell anode, the refractory metal precursor is preferably a valve metal or film forming metal precursor. The valve metals include titanium, preferred, aluminum, zirconium, tantalum, tungsten, niobium and hafnium. These valve metals, coated with electrocatalyst, provide generally efficacious anode characteristics for halogen evolution from brine solutions of an alkali or alkaline earth metal salt of the halogen.

Particularly where a cation exchange membrane is utilized as a separator, use of anodes made in accordance with the instant invention can provide efficient utilization of available cation transfer areas of the membrane in a narrow gap configuration wherein the membrane substantially contacts the anode.

While a preferred embodiment has been shown and described in detail, it should be apparent that various alterations and/or modifications can be made thereto without departing from the scope of the claims following.

What is claimed is:

1. A self-supporting reticulate of titanium hydride essentially free of carbonaceous matter or a self-supporting reticulate of titanium essentially free of carbonaceous matter, said reticulate having an open cell foam morphology including interconnected pores in the size range from about 0.04 cm to about 1.0 cm bounded by strands having an average thickness of less than 10 mils.

2. The self-supporting reticulate of claim 1 wherein said pores are in the range from about 0.5 cm to about 0.05 cm, said strands have an average thickness in the range from about 0.2 mils to about 5.0 mils.

3. The self-supporting reticulate of claim 2 having a porosity in the range from about 50% to about 98%.

4. A reticulate comprising an inorganic substrate having an open cell foam morphology including interconnected pores in the size range from about 0.04 cm to about 1.0 cm coated essentially uniformly with titanium hydride essentially free of carbonaceous material or coated essentially uniformly with titanium essentially free of carbonaceous material, said titanium hydride or titanium being present in a thickness insufficient to increase substantially the pressure drop through said reticulate over that through the uncoated inorganic substrate.

5. The reticulate of claim 4, wherein said pores are in the range from about 0.05 cm to about 0.5 cm, and said titanium hydride or titanium is present as a coating having a thickness in the range from about 0.2 mils to about 5.0 mils.

6. The reticulate of claim 5, wherein said increase in pressure drop is less than 10%, and the porosity of said reticulate is in the range from about 50% to about 98%.

7. The reticulate of claim 6, wherein said inorganic substrate is an open cell refractory material selected from the group consisting of alumina, zirconia, and siliceous compounds.

8. A method for making a self-supporting reticulate of titanium hydride, comprising, (a) blending particles of titanium hydride and a binder which is essentially unreactive with said particles at the decomposition temperature of said binder, to form a slurry in which the weight ratio of said hydride to said binder is at least 2:1; (b) contacting a pore-forming means or pore-former having pores in the size range from about 0.04 cm to about 1.0 cm, with said slurry to form a shaped mass of substantially uniformly slurry-coated pore-former which is essentially unreactive with, said slurry and insoluble in it; and, (c) removing said binder and said pore-former from said shaped mass at a temperature below about 400° C., so as to form a green reticulate of said hydride, essentially free of carbonaceous material, and having pores in said size range.

9. The method of claim 8, whereby the resultant reticulate is a reticulate of titanium, comprising further including step (d) heating said green reticulate at substantially atmospheric pressure in an atmosphere of helium or argon at a temperature above 600° C. but below the melting point of titanium, for a period of time sufficient to effect a shrinkage of said green reticulate so as to form an essentially pure titanium reticulate.

10. The method of claim 8 or 9, wherein said self-supporting reticulate has pores in the range from about 0.05 cm to about 0.5 cm, and unitary or individual strands of said reticulate have an average thickness in the range from about 0.2 mil to about 5.0 mils.

11. The method of claim 10, wherein said weight ratio of said hydride to said binder is in the range from about 20:1 to about 50:1, and said reticulate has a porosity in the range from about 50% to about 98%.

12. A method for making a reticulate of titanium hydride supported on an inorganic substrate, comprising, (a) blending particles of titanium hydride and a binder which is essentially unreactive with said particles at the decomposition temperature of said binder, to form a slurry in which the weight ratio of said hydride to said binder is at least 2:1; (b) contacting a pore-forming means or pore-former comprising an inorganic refractory material having pores in the size range from about 0.04 cm to about 1.0 cm, with said slurry to form a shaped mass of substantially uniformly slurry-coated pore-former which is essentially unreactive with said slurry and insoluble in it; and (c) removing said binder from said shaped mass at a temperature below about 400° C. so as to form a coating of green reticulate of said hydride, essentially free of carbonaceous material, supported on said pore-former, said coating having a thickness insufficient to increase substantially the pressure drop through said reticulate over that of the uncoated inorganic substrate.

13. The method of claim 12, whereby the resultant reticulate is a reticulate of titanium supported on an inorganic substrate, comprising further including step (d) heating said green reticulate at substantially atmospheric pressure in an atmosphere of helium or argon at a temperature above 600° C. but below the melting point of titanium, for a period of time sufficient to form a coating of essentially pure titanium on said inorganic substrate.

14. The method of claim 12 or 13, wherein said reticulate supported on said inorganic substrate has pores in the range from about 0.05 cm to about 0.5 cm, and unitary or individual strands of said reticulate have an average thickness in the range from about 0.2 mils to about 5.0 mils.

15. The method of claim 14, wherein said weight ratio of said hydride to said binder is in the range from about 20:1 to about 50:1, and said reticulate has a porosity in the range from about 50% to about 98%.

16. An anode for use in an electrochemical cell, comprising, a reticulate of essentially pure titanium having an electrocatalytic coating comprising at least one platinum group metal oxide, said reticulate having an open cell foam morphology including interconnected pores in the size range from about 0.04 cm to about 1.0 cm bounded by strands having an average thickness of less than 10 mils.

17. The anode of claim 16, wherein said reticulate is essentially free of titanium carbide, and wherein said pores are in the range from about 0.5 cm to about 0.5 cm, and said strands have an average thickness in the range from about 0.2 mil to about 5.0 mils.

18. The anode of claim 17, wherein said reticulate has a porosity in the range from about 50% to about 98%.

19. A catalytic reticulate of essentially pure titanium support having a catalyst coating, said titanium support having an open cell foam morphology including interconnected pores in the size range from about 0.04 cm to about 1.0 cm bounded by strands having an average thickness of less than 10 mils.

20. The catalytic reticulate of claim 19 having a porosity in the range from about 50 percent to about 98 percent.

* * * * *